United States Patent [19]
Moughani et al.

[11] Patent Number: 5,970,246
[45] Date of Patent: Oct. 19, 1999

[54] DATA PROCESSING SYSTEM HAVING A TRACE MECHANISM AND METHOD THEREFOR

[75] Inventors: Claude Moughani, Austin; William C. Moyer, Dripping Springs; Taimur Aslam, Austin, all of Tex.

[73] Assignee: Motorola Inc., Austin, Tex.

[21] Appl. No.: 08/927,524

[22] Filed: Sep. 11, 1997

[51] Int. Cl.[6] .................................................... G06F 9/44
[52] U.S. Cl. ............... 395/704; 395/183.08; 395/183.03; 395/183.14; 395/184.01; 395/186; 395/500; 711/152; 711/154; 711/163; 711/1
[58] Field of Search ............................... 395/704, 183.03, 395/183.04, 183.05, 183.11, 183.14, 183.08, 186, 184.01, 500; 711/100, 152, 154, 163, 1; 364/578

[56] References Cited

U.S. PATENT DOCUMENTS 5,513,337  4/1996  Gillespie et al. ..................... 711/152
5,701,486  12/1997 Gilbertsen et al. .................... 395/704
5,850,562  12/1998 Crump et al. ...................... 395/183.16
5,870,606  2/1999  Lindsey ................................. 395/704
5,870,607  2/1999  Netzer .................................. 395/704

Primary Examiner—Tariq R. Hafiz
Assistant Examiner—Tuan Q. Dam
Attorney, Agent, or Firm—Daniel D. Hill

[57] ABSTRACT

A data processing system (10) having an access protect unit (20) for tracing memory accesses. A trace bit (50) is associated with each page of memory and when set generates an interrupt signal on a first valid access to the page. The access protect unit (20) supports trace in both supervisor and user mode without the need for an emulation system or an on-chip emulator. Tracing is done without providing "back-door" access to the central processing unit (CPU). The access protect unit (20) allows programmable memory segment tracing. Signature monitoring of memory accesses is accomplished by storing sequential memory segments in a plurality of registers.

23 Claims, 5 Drawing Sheets

DATA PROCESSING SYSTEM HAVING A TRACE MECHANISM AND METHOD THEREFOR

FIELD OF THE INVENTION

This invention relates in general to data processing, and more specifically to a data processing system having a trace mechanism and method therefor.

BACKGROUND OF THE INVENTION

Data processing systems, such as microcontrollers and microprocessors, are becoming increasingly complex and may include a large number of peripherals, busses, memories, and control units. Therefore, the control and operation of these many units within one data processing system is becoming more complex. In order to debug operable code used for controlling a data processing system and its constituent parts, it is often necessary to use a debug and tracing program.

Typical software debugging involves using an emulation system. This often requires the manufacture of two devices; a first for the user and another for debugging the code, where the debug version of the device allows access to information that is otherwise hidden from the user. Emulation systems are often complicated and cumbersome. Additionally, emulators are costly and are not easily transported for field debugging. As these tools developed, designers were able to allow debugging in the background as the device operated in a user mode. Another type of debugging is done with an on-chip emulator. On-chip emulation has the drawback of requiring silicon area to provide an emulator which will not be used by the user, and also requires an input/output (I/O) interface.

In addition to the normal complexity of data processing systems, specific memory areas within the data processor may be access protected. Access protection may be used to protect certain memory areas from being written to, read from, or to prevent code stored therein from being executed. Access protection may involve a combination of these protections, and may certain users access while denying access to others. While emulators, both on and off the device, offer extensive debug capability, they often compromise access protection and the security of the code and data stored in a device by offering a "backdoor" into the device.

It is desirable to be able to debug a data processing system while maintaining the access protection of these specific memory areas and to maintain the security of the system. It is also desirable to have a convenient method of debugging device code in the field without the hardware typically associated with emulation.

DETAILED DESCRIPTION OF A PREFERRED EMBODIMENT

Generally, the present invention provides a method for tracing operational code in a data processing system having access protected memory locations. An access protect unit allows for tracing memory accesses. A programmable trace bit is associated with each page, or segment, of memory and when set generates an interrupt signal on a first valid access to the page, allowing programmable memory segment tracing. Also, signature monitoring of memory accesses is accomplished by storing addresses of sequential memory segments in a plurality of registers. The access protect unit supports code tracing in both a supervisor and a user mode without the need for a separate emulation system or an on-chip emulator. Coarse grain tracing by page location and programmable grain tracing allows temporal monitoring of memory accesses without providing a "backdoor" access to the central processing unit (CPU).

Figure 1:
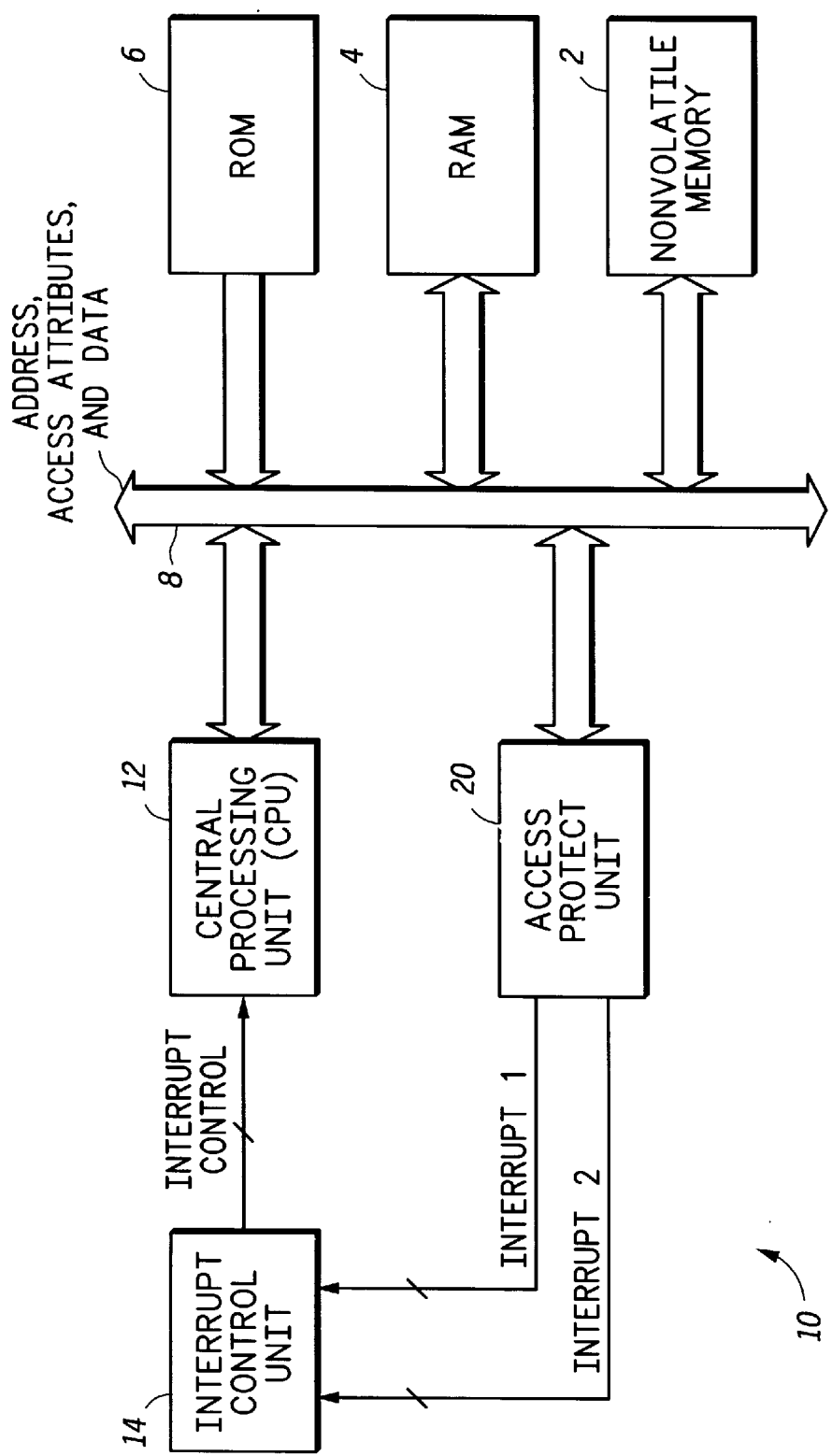
FIG. 1 illustrates, in block diagram form, a data processor in accordance with an embodiment of the present invention.

The present invention can be more fully described with reference to FIGS. 1–7. FIG. 1 illustrates, in block diagram form, one embodiment of the present invention where a data processor 10 includes a central processing unit (CPU) 12, an access protect unit 20, an interrupt control unit 14, a read only memory (ROM) 6, a random access memory (RAM) 4, a non-volatile memory 2, and an inter-module bus 8. CPU 12 is bi-directionally coupled to bus 8 and provides information to bus 8, where the information includes address, data, and address attribute information labeled "ADDRESS, ACCESS ATTRIBUTES, AND DATA". Note that other information, such as control signals, may be transmitted on bus 8. However, this other information is not important for describing the invention and has been omitted from this description for purposes of simplicity and clarity. ROM 6 and RAM 4 are both bi-directionally coupled to bus 8. Additionally, access protect unit 20 is bi-directionally coupled to bus 8, and is coupled to interrupt control unit 14. Access protect unit 20 provides interrupt signals labeled "INTERRUPT 1" and "INTERRUPT 2" to interrupt control unit 14. In response to receiving an interrupt signal, interrupt control 14 includes control logic which provides an interrupt control signal to CPU 12 labeled "INTERRUPT CONTROL". Note that the memory units shown in FIG. 1 are for illustration purposes only and other embodiments may include a different number of memory units made up of different types of memory.

Figure 2:
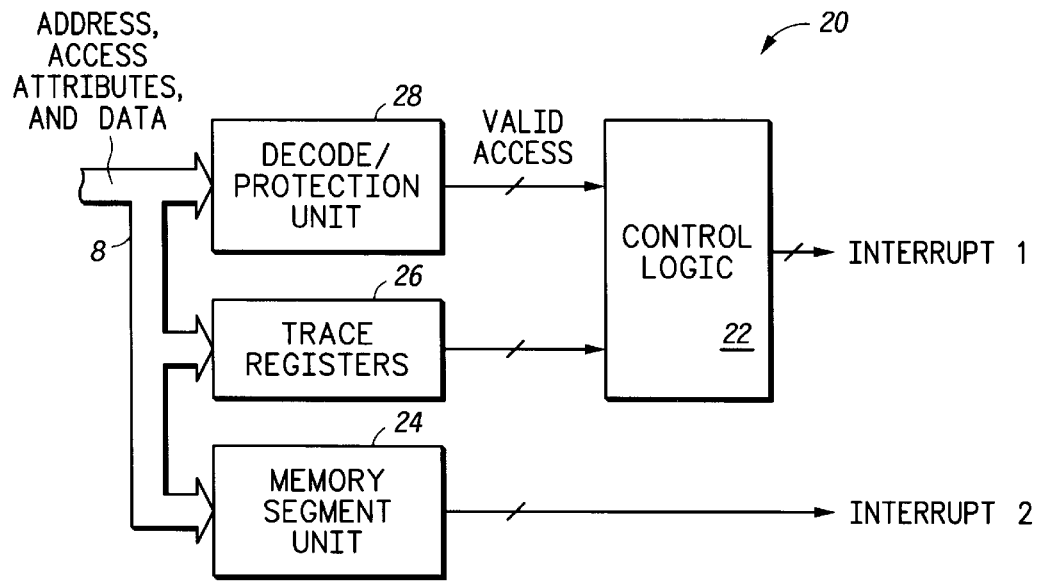
FIG. 2 illustrates, in block diagram form, an access protect unit of the data processor of FIG. 1.

Access protect unit 20 of FIG. 1 is illustrated in greater detail in FIG. 2. Access protect unit 20 includes a decode/protection unit 28, which is coupled to bus 8. Decode/protection unit 28 is further coupled to control logic 22. Decode/protection unit 28 provides a valid access signal to control logic 22 labeled "VALID ACCESS". Control logic 22 provides interrupt signal INTERRUPT 1 to interrupt control 14 (FIG. 1). Trace registers 26 and memory segment unit 24 are coupled to bus 8. Decode/protection unit 28, trace registers 26, and memory segment unit 24 receive ADDRESS, ACCESS ATTRIBUTES, and DATA from bus 8. Memory segment unit 24 provides INTERRUPT 2 to interrupt control 14.

Figure 3:
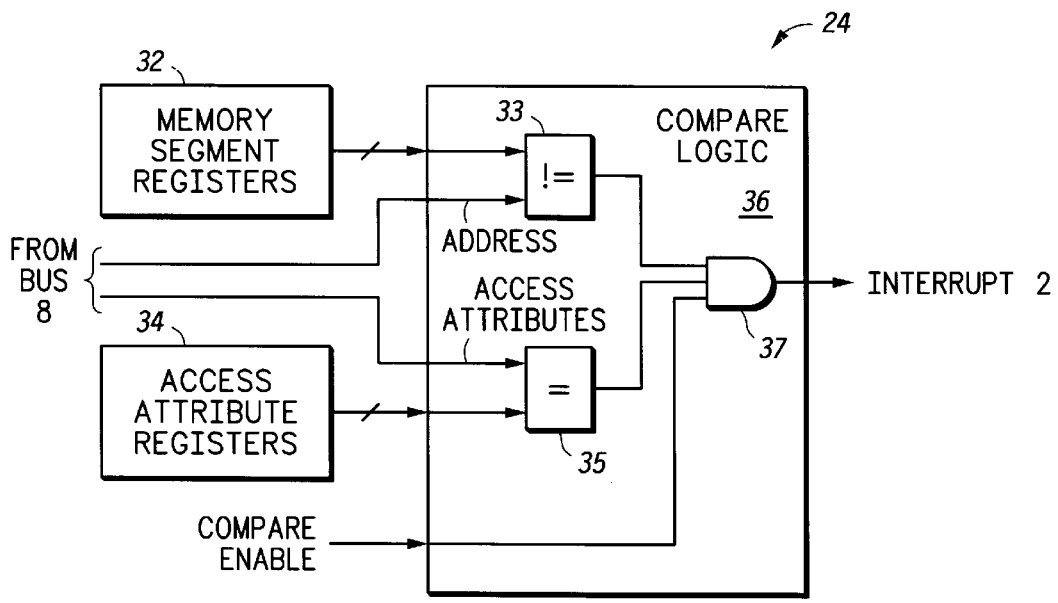
FIG. 3 illustrates, in block diagram form, a portion of the access protect unit of FIG. 2.

Memory segment unit 24 is illustrated in further detail in FIG. 3. Memory segment unit 24 includes memory segment registers 32, access attribute registers 34, and compare logic 36. Compare logic 36 receives a compare enable signal, labeled "COMPARE ENABLE", which enables compare logic 36. Compare logic 36 also receives ACCESS ATTRIBUTES and ADDRESS from bus 8. Access attribute registers 34 store programmable access attributes for defining allowable types of accesses. The stored access attributes are compared with the current access attributes corresponding to an address to be accessed. The current access attributes are received by way of bus 8. Memory segment registers 32 provide a memory segment address which is compared with the address received from bus 8. Memory segment registers 32 store addresses corresponding to predetermined portions of memory, such as for example non-volatile memory 2. The memory segment address designates the address range of the memory segment by storing the most significant bits of an address to a location in memory. Note that the address to be accessed includes access attribute information, which may include write, read, and/or execute access information. This information is stored in registers (not shown) in the decode/protection unit 28 of FIG. 2.

The contents of memory segment registers 32 and the address to be accessed are compared in comparator 33. Access attribute registers 34 information and access attributes from bus 8 are compared in comparator 35. The compare enable signal along with the outputs of blocks 33 and 35 are provided to an AND logic circuit 37. The output of AND logic circuit 37 is a logical AND of the outputs of comparators 33 and 35 and the COMPARE ENABLE signal, and is interrupt signal INTERRUPT 2.

Figure 4:
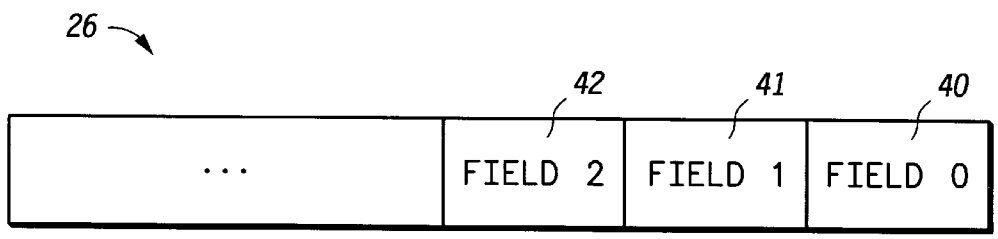
FIG. 4 illustrates the trace register of FIG. 2 in accordance with one embodiment of the present invention.

FIG. 4 illustrates one embodiment of trace registers 26 of FIG. 2. Trace registers 26 include a plurality of bit fields 40, 41, and 42, labeled "FIELD 0", "FIELD 1", and "FIELD 2", respectively, where each bit field corresponds to a particular memory segment in data processing system 10. In one embodiment, each bit field includes a single trace bit. When the trace bit is asserted, and a valid access is made to a valid memory segment, an interrupt is generated which is provided to CPU 12. In other embodiments, the bit fields of trace register 26 may include any number of bits.

Figure 5:
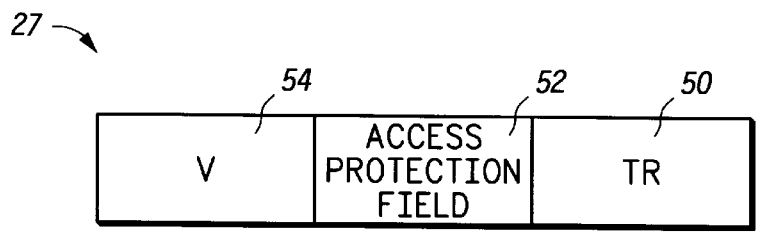
FIG. 5 illustrates an access attribute register in accordance with one embodiment of the present invention.

FIG. 5 illustrates an alternate embodiment of the trace registers 26 in accordance with the present invention. The register 27 of FIG. 5 includes bit fields 50, 52, and 54. Bit field 50 is a trace bit field, labeled "TR". Bit field 52 is an access protection field, labeled "ACCESS PROTECTION FIELD", and including access protection bits, each bit corresponding to an access type such as write, read or execute, or any combination of these. Bit field 54 is a valid bit field labeled "V". Valid bit field 54 indicates whether an address to be accessed is a valid address, and access protection field 52 indicates the protection for the address to be accessed.

Figure 6:
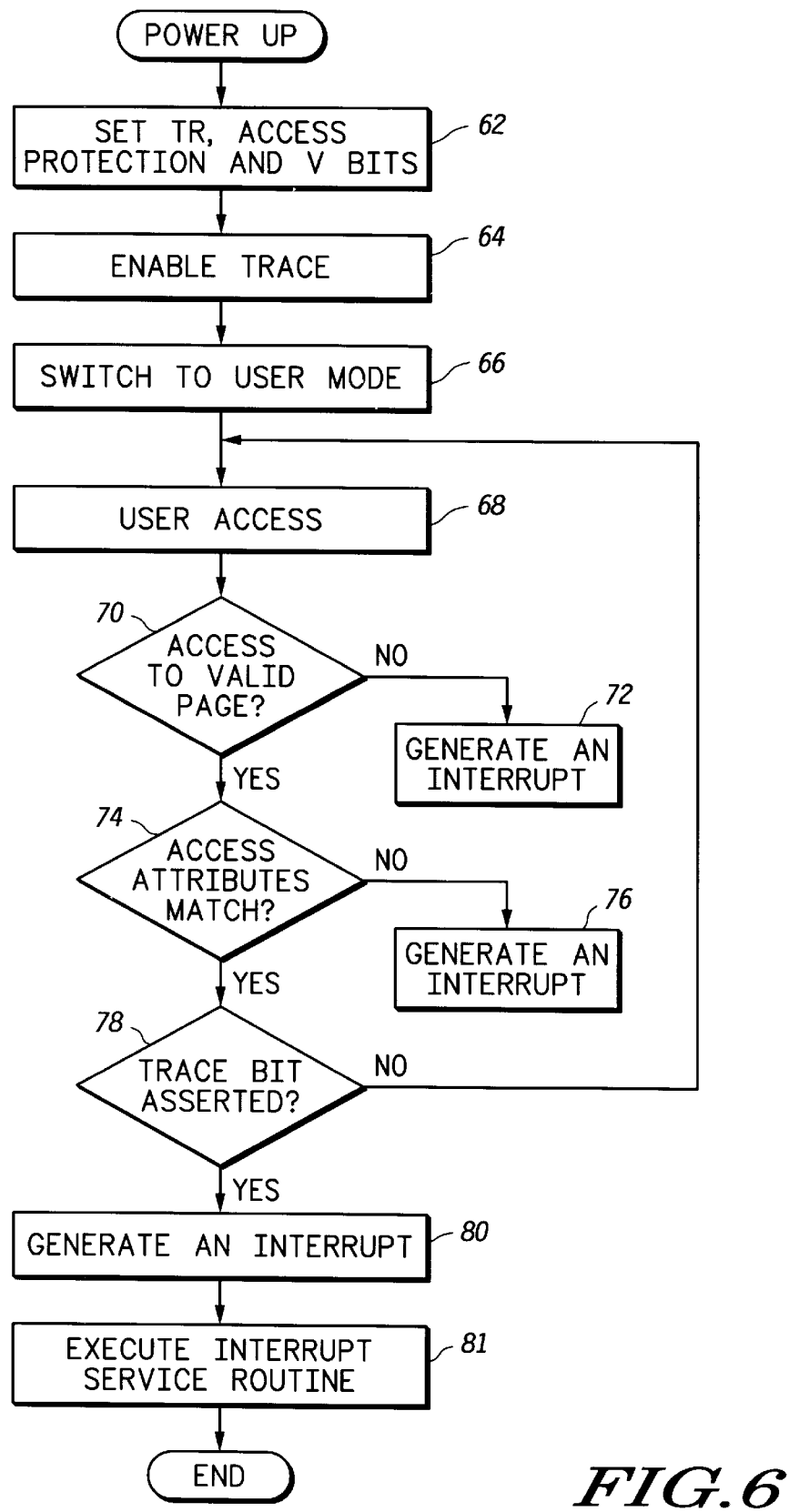
FIG. 6 illustrates, in flow diagram form, a trace method in accordance with one embodiment of the present invention.

FIG. 6 illustrates a flow chart for a method of memory segment tracing of an access protected memory in accordance with the present invention. In FIG. 6 data processing system 10 is first powered up or reset in a supervisor mode. Supervisor mode indicates that the supervisor has access to all areas of the data processing system. This includes areas which are access protected during a user mode. The user and supervisor modes of operation are well known in the art and will not be discussed further. At step 62, the supervisor will first set the trace bit in, for example, bit field TR, the access protection bits, and the valid bit field V for each memory segment. At this point the supervisor has initialized the hardware in preparation for operation and user mode. Flow continues to step 64, where tracing of the access protected memory is enabled. Trace enablement indicates that access protect unit 20, as illustrated in FIG. 1, is enabled. Access protect unit 20 is enabled by the supervisor. Disabling access protect unit 20 bypasses tracing based on bit field TR. At step 66, operation of data processing system 10 is switched from supervisor mode to user mode. At step 68, an access to data processing system 10 is initiated.

At decision block 70, it is determined if the address for the particular memory segment, such as a page of memory, to be accessed is valid by checking the valid bit in, for example, bit field 54 of FIG. 5. A valid page is a page, or memory segment, that has been defined by the program. Each page or memory segment corresponds to a memory or peripheral area, and has a valid bit field associated with it. Once the information of a page of memory is defined, the information located in that page or memory segment is valid for use by the system. The valid bit is then asserted to indicate that the information in that page is defined and valid. If an access to a page that is not valid (i.e. the valid bit is negated), the NO path is taken to step 72 and an interrupt is generated, and an interrupt handling routine is to be executed. The interrupt may, for example, cause data processing system to shut down, or provide predetermined information to a display. If the access is to a valid page, the YES path is taken and the process flow continues to decision step 74. At decision step 74, it is determined if the access attributes of the memory segment to be accessed match with the access attributes stored in access attribute register 34. In one embodiment of the present invention, illustrated in FIG. 4, this information is located in access protection field 52 of register 27. If the access attributes do not match then the NO path is taken to step 76 and an interrupt is generated. An interrupt handling routine is executed to deal with the access attribute mismatch. If the access attributes match, or compare favorably with each other, then the YES path is taken from decision step 74 to decision step 78.

At decision step 78, it is determined if the corresponding trace bit is asserted. If the trace bit is not asserted, then tracing of memory segment is not allowed, and the NO path is taken to step 68. If the trace bit is asserted, the YES path is taken to step 80 and an interrupt is generated. Process flow then continues to step 81 where an interrupt service routine is executed.

In summary, as a user accesses an address in a memory segment, the address is checked to make sure that it is: (1) a valid address; (2) the attributes of the address are verified to be a desired access type; and (3) the trace bit is checked to determine if tracing of the memory segment is allowed. The validity information and the trace information are both provided to control logic 22, as illustrated in FIG. 2. Control logic 22 generates an interrupt if the address to be accessed is a valid address, and the access attributes match, and the trace bit is set. Unless the trace bit is set, a user is denied access to access protected memory segments in user mode.

The interrupt service routine may trace memory segment accesses for debugging the code, or may verify status registers, or may perform any other debug function. Typically, a software handler would be used to allow for a sophisticated trace algorithm. In one embodiment of the present invention, the interrupt service routine searches for a first access to a specific page. The interrupt puts the device in supervisor mode where non-volatile memory 2 may be modified. Additionally, other memory units, such as RAM 4, or other peripheral modules within data processor 10, may also be modified.

When the trace bit associated with a given page is asserted, the first access to that page will trigger an interrupt. It is then possible to determine an access ordering of a plurality of pages within data processing system 10 by first setting all of the trace bits associated with the pages within data processing system 10. As an address is accessed within data processing system 10, the asserted trace bit will generate an interrupt. The interrupt service routine will then negate the trace bit associated with that initial page. Further accesses within that page will not trigger further traces, however the subsequent page to be accessed will trigger an interrupt as its trace bit remains asserted. At this point the interrupt service routine will negate the trace bit associated with the subsequent page, and once again set the trace bit associated with the initial page. In this way accesses to a series of pages can be traced and compared to an expected or predetermined sequence of page accesses. By having a trace bit corresponding to each page of memory in data processing 10, the present invention allows for page granularity tracing of the code within the system.

Figure 7:
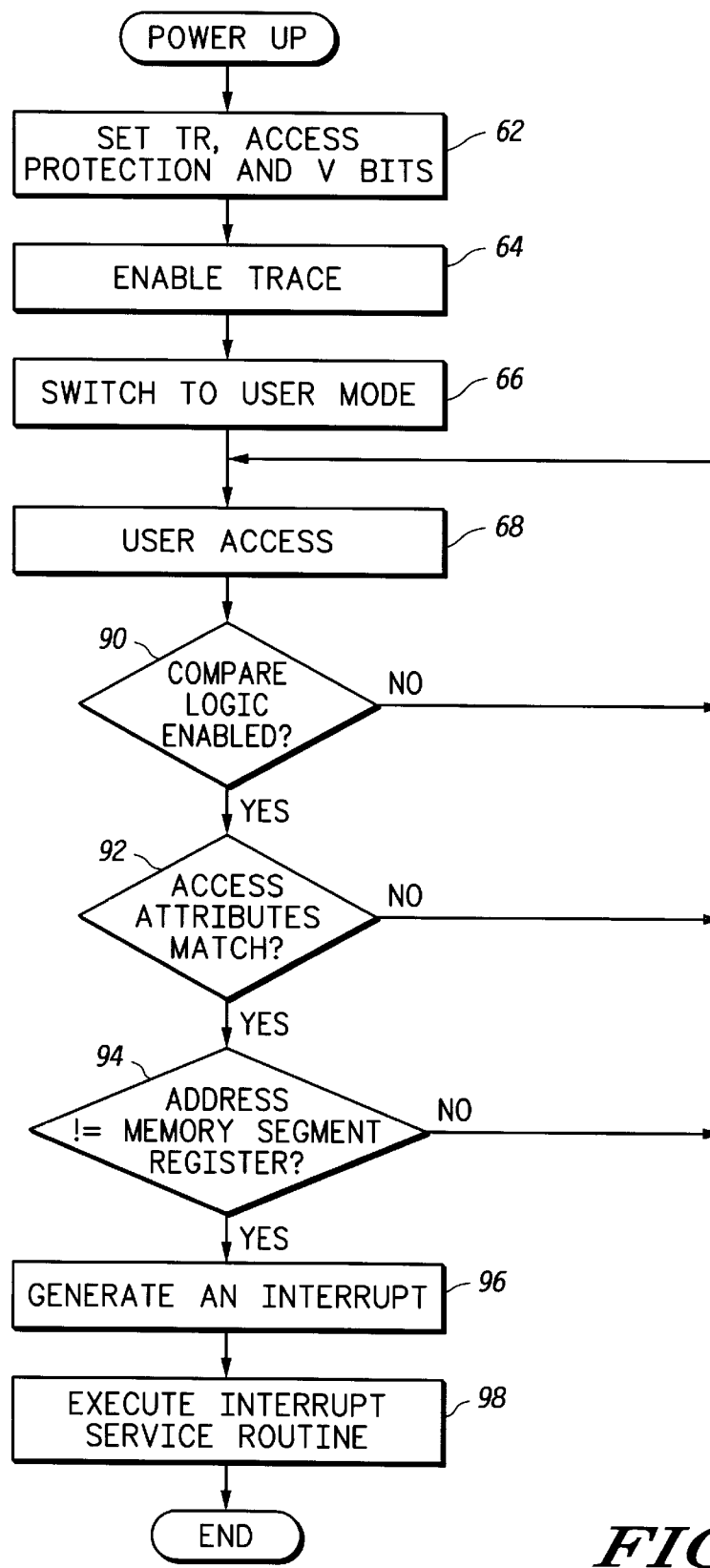
FIG. 7 illustrates, in flow diagram form, a trace method in accordance with another embodiment of the present invention.

FIG. 7 illustrates a flow diagram for tracing memory segment accesses. Data processing system 10 is first powered up in a supervisor mode. Note that steps 62, 64, 66, and 68 are the same as the steps having the same reference numbers in FIG. 6. At step 62, the supervisor sets the trace bit, access protection bits, and valid bit. The supervisor enables tracing at step 64, which includes enabling compare logic 36, illustrated in FIG. 3, to allow for memory segment tracing of access protected memory. At step 66, data processing system 10 is switched into user mode. At step 68, an access to a memory segment is made. Note that process flow could continue in supervisor mode, where user access at block 68 is replaced by a supervisor access. At decision step 90, it is determined if the compare logic has been enabled. If the compare logic has not been enabled, the NO path is taken to step 68. If the compare logic has been enabled, the YES path is taken to step 92. At decision step 92, it is determined if the access attributes match. If the access attributes of the address to be accessed match the access attributes of access attribute registers 34, illustrated in FIG. 3, the YES path is taken to decision step 94. If the access attributes do not match, the NO path is taken back to step 68.

At decision step 94, it is determined whether or not the address to be accessed is within the memory segment designated by memory segment register 32. Comparator 33 performs a not equal to comparison. If an access to an address is not the same as the address stored memory segment register 32, then the access is to a different memory segment and the YES path is taken to step 96, and compare logic 36 generates an interrupt. Process flow then continues to step 98 to and an interrupt service routine is executed. If the address is the same as the address stored in memory segment register 32, then the requested access still within the same memory segment and the NO path is taken back to step 68.

Typically memory segment registers 32 will designate a memory segment by providing a predetermined number of most significant bits of an address. These bits of the address are then compared to the address to be accessed. By changing the predetermined number of bits, the size of the memory segment may be altered. Note that according to the flow chart of FIG. 7, if the address is within the memory segment indicated by memory segment register 32 data processing 10 does not generate an interrupt or execute an interrupt routine. Likewise, if the access attributes do not match in decision step 92, process flow returns to step 68 and no interrupt is generated. Additionally if the compare logic 36 is not enabled, compare logic 36 will not generate an interrupt. Referring to FIG. 2, memory segment unit 24 allows a predetermined memory segment to be designated and any accesses outside of that segment will cause an interrupt. Memory segment unit 24 allows a memory segment trace of both user and supervisor code.

The present invention offers a method of tracing and debugging program code during both user or supervisor mode, without the need for expensive emulation hardware. Additionally, the present invention does not increase the silicon area of data processing system 10 because an onboard emulation module is not required. The present invention offers a flexible method of monitoring access to one or more memory segments or pages. Also, the present invention offers a tracing method which is useful for debugging code in the field without requiring excessive debug equipment and software. Additionally, the present invention allows effective debug without creating "backdoor" access to the CPU. This is done by maintaining the access protection of memory within data processing system 10.

Also, memory segment unit 24, illustrated in FIG. 2, may be used to determine if the user or supervisor code is being executed in a predetermined sequence. This may be accomplished either by a plurality of registers within memory segment register 32 or by software in the interrupt service routine. According to one embodiment of the present invention memory segment registers 32 includes a plurality of registers where each is associated with a sequentially accessed area of memory. Comparator 33 of FIG. 3 is coupled to each of the plurality of registers to compare not only a first access to a memory segment in a first register, but a sequence of accesses to addresses stored in the plurality of registers. In this way the signature, or sequence, of memory accesses is monitored to determine a breach of the signature. Alternately, a single register could be implemented in memory segment registers 32. An access outside of the memory segment causes an interrupt to trigger if the access attributes match those in access attribute register 34. An interrupt service routine then updates the register in memory segment registers 32 and/or access attribute register 34. In this way the signature of the user's supervisor code is traced by software. This information is helpful in determining if there has been any breach in security. The debug and trace functions of the present invention are consistent with this signature monitoring. The present invention requires a minimum amount of overhead, and reduces the need for the extensive emulation systems of the past.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data processing system, comprising:

a central processing unit;

a memory unit having a plurality of memory segments, a memory segment of the plurality of memory segments being accessible in response to receiving an address; and an access protection unit, coupled to the central processing unit, for receiving the address, and in response to a programmable trace bit being asserted, the access protection unit generating an interrupt and providing the interrupt to the central processing unit when accessing the memory segment corresponding to the address;

wherein the programmable trace bit is independent of a validity of contents of the memory segment.

2. The data processing system of claim 1, further comprising a valid bit associated with the validity of the contents of a corresponding memory segment of the plurality of memory segments.

3. The data processing system of claim 1, further comprising an attribute bit field associated with the validity of an access of a corresponding memory segment of the plurality of memory segments, the attribute bit field for indicating a type of allowable access to the memory segment.

4. The data processing system of claim 1, wherein the interrupt is for enabling tracing of memory segment access while the data processing system is operating in a user mode.

5. The data processing system of claim 1, wherein the data processing system has a supervisor mode and a user mode, wherein the programmable trace bit is asserted during supervisor mode and tracing of memory segment access occurs while the data processing system is operating in a user mode.

6. The data processing system of claim 1, further comprising:
- a memory segment register for storing a second address corresponding to a predetermined portion of the memory unit;
- a first comparator having a first input terminal for receiving the second address, a second input terminal for receiving the address, and an output terminal for providing a first output signal in response to the second address being different than the address;
- an access attribute register for storing attribute information for access types for the plurality of memory segments;
- a second comparator having a first input terminal for receiving the attribute information, a second input terminal for receiving current attribute information, and an output terminal for providing a second output signal in response to the attribute information being the same as the current attribute information; and
- a logic circuit, having a first input terminal for receiving an enable signal, a second input terminal for receiving the first output signal, a third input terminal for receiving the second output signal, and an output terminal for generating a second interrupt and providing the second interrupt to the central processing unit.

7. The data processing system of claim 6, wherein the second interrupt is generated when the data processing system is operating in either a supervisor mode or in a user mode.

8. The data processing system of claim 6, wherein a size of the predetermined portion of the memory unit is programmable.

9. The data processing system of claim 6, wherein the attribute information corresponds to multiple access types.

10. A data processing system, comprising:
- a central processing unit;
- a memory unit having a plurality of memory segments, a memory segment of the plurality of memory segments accessible in response to receiving an address; and
- an access protection unit, coupled to the central processing unit, for receiving the address, and in response to receiving programmable access attributes for defining access types, the access protection unit generating an interrupt and providing the interrupt to the central processing unit when a current address is not the same as a previous address and access attributes of the current address compare favorably with the programmable access attributes.

11. The data processing system of claim 10, wherein the access protection unit comprises:
- a memory segment register for storing a second address corresponding to a memory segment of the memory unit;
- a first comparator having a first input terminal for receiving the second address, a second input terminal for receiving the address, and an output terminal for providing a first output signal in response to the second address being different than the address;
- an access protection register for storing attribute information for access types for the plurality of memory segments;
- a second comparator having a first input terminal for receiving the attribute information, a second input terminal for receiving current attribute information, and an output terminal for providing a second output signal in response to the attribute information being the same as the current attribute information; and
- a logic circuit, having a first input terminal for receiving an enable signal, a second input terminal for receiving the first output signal, a third input terminal for receiving the second output signal, and an output terminal for providing a second to the central processing unit.

12. The data processing system of claim 11, wherein the second interrupt is generated when the data processing system is operating in either a supervisor mode or in a user mode.

13. The data processing system of claim 11, wherein a size of the memory segment is programmable.

14. The data processing system of claim 11, wherein the attribute information corresponds to multiple access types.

15. The data processing system of claim 10, further comprising a programmable trace bit, the access protection unit generating an interrupt and providing the interrupt to the central processing unit when accessing the memory segment corresponding to the address and the programmable trace bit is asserted, wherein the programmable trace bit is independent of a validity of contents of the memory segment.

16. The data processing system of claim 15, further comprising a valid bit associated with the validity of the contents of a corresponding memory segment of the plurality of memory segments.

17. The data processing system of claim 15, wherein the interrupt enables tracing of memory segment access while the data processing system is operating in a user mode.

18. The data processing system of claim 15, wherein the data processing system has a supervisor mode and a user mode, wherein the programmable trace bit is asserted during the supervisor mode and the tracing of memory segment access occurs while the data processing system is operating in a user mode.

19. In a data processing system having a central processing unit and a memory unit, the memory unit having a plurality of memory segments, a method for tracing access to a memory segment of the plurality of memory segments, the method comprising the steps of:
- entering a supervisor mode of operation of the data processing system;
- enabling access tracing of the memory segment;
- switching the data processing system to a user mode of operation;
- determining that a user access to the memory segment is an allowable access type;
- determining that a trace bit corresponding to the memory segment is asserted; and
- generating an interrupt and providing the interrupt to the central processing unit.

20. The method of claim 19, further comprising the step of determining that the memory segment is storing valid data during the user access.

21. In a data processing system having a central processing unit and a memory unit, the memory unit having a plurality of memory segments, a method for tracing access to a memory segment of the plurality of memory segments, the method comprising the steps of:

storing first access attribute information;

receiving second access attribute information;

determining that the first access attribute information compares favorably with second access attribute information;

storing a first address for the memory segment;

receiving a second address;

determining that first address is not the same as the second address;

generating an interrupt; and providing the interrupt to the central processing unit, wherein the interrupt is for tracing the access.

22. The method of claim 21, wherein if a plurality of accesses to the plurality of memory segments occur in an order different from a predetermined order, generating an interrupt and providing the interrupt to the central processing unit.

23. The method of claim 21, wherein during a plurality of accesses to the plurality of memory segments, a second interrupt is generated after each access of the plurality of accesses to a different memory segment, and in response to receiving each of the second interrupts, the central processing unit determining if an order of the plurality of accesses to the different memory segments is different from a predetermined order.

* * * * *